(12) United States Patent
Kawahara et al.

(10) Patent No.: US 6,429,413 B1
(45) Date of Patent: Aug. 6, 2002

(54) IMAGE SENSOR HAVING UNIT LIGHT RECEIVING CIRCUIT WITH SAMPLE-AND-HOLD MEANS

(75) Inventors: Yukito Kawahara; Satoshi Machida; Masahiro Yokomichi; Kenji Yoshida, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/421,596

(22) Filed: Oct. 20, 1999

(30) Foreign Application Priority Data

Oct. 23, 1998 (JP) .......................................... 10-302267

(51) Int. Cl.[7] .............................................. H01L 27/14
(52) U.S. Cl. .................... 250/208.1; 257/292; 348/300; 348/308
(58) Field of Search ......................... 250/208.1, 214 R, 250/214 A, 214 LA, 214 LS; 257/290, 291, 292, 431, 443, 444; 348/294, 300, 301, 308

(56) References Cited

U.S. PATENT DOCUMENTS 6,140,630 A * 10/2000 Rhodes ..................... 250/208.1
6,215,113 B1 * 4/2001 Chen et al. ............... 250/208.1

* cited by examiner

*Primary Examiner*—Que T. Le
*Assistant Examiner*—Kevin Pyo
(74) *Attorney, Agent, or Firm*—Adams & Wilks

(57) ABSTRACT

To eliminate a residual image due to residual charge in an image sensor circuit and provide an effective bright-time output, the image sensor is provided with a reset switch connected to a photodiode. After the potential of the photodiode is held through a first amplifier in two holding circuits as an image signal and an initial signal, the initial signal and the image signal are sequentially output through a second amplifier. By resetting the photodiode to a desired potential to produce an initial signal, a residual image can be eliminated.

20 Claims, 9 Drawing Sheets

IMAGE SENSOR HAVING UNIT LIGHT RECEIVING CIRCUIT WITH SAMPLE-AND-HOLD MEANS

BACKGROUND OF THE INVENTION

The present invention relates to a one-dimensional image sensor which receives a reflected light from an original document that has been irradiated with light and converts it into an electrical signal using a photodetector, and is applied to an image reading apparatus such as a FAX or a scanner.

FIG. 9 shows a circuit diagram of a contact type one-dimensional image sensor IC used for a conventional reading apparatus of a FAX. As shown in FIG. 9, it is a system in which an output of a phototransistor PTR is read out to a common signal line LSIG by sequentially turning on switches S1 to Sn.

The contact type phototransistor one-dimensional image sensor as described above is disclosed in Japanese published unexamined utility model application No.S61-124171.

SUMMARY OF THE INVENTION

However, in such a one-dimensional image sensor, since carriers remaining in a base of the phototransistor PTR are removed through an emitter, there has been the problem that a base potential can not be sufficiently reset to an initial state, and a residual image is serious. Besides, in order to obtain an effective bright-time output, a light source is placed in an OFF state to make a dark state prior to reading of an original document, a dark-time output is read out, and its value is recorded, and then, the light source is placed in an ON state to irradiate the original document with light, a bright-time output is read out, and a difference from the dark-time output previously recorded is obtained, so that the effective bright-time output is obtained. However, in this system, there has been a problem in that a memory for recording the dark-time output must be provided, so that an increase in costs is caused. Besides, in many cases, the previous dark-time output is not set at any time, but is set only one time when installed in a final product such as a facsimile and is shipped from a factory, and if the dark-time output has temperature characteristics, there has been also a problem in that a dark-time output recorded at the time of shipment from the factory is different from a dark-time output when an original document is actually read, so that an effective bright-time output is not correctly obtained and reproduced image quality becomes deteriorated.

In order to solve such conventional problems, an object of the present invention is to provide an image sensor with a low cost and low residual image, and to obtain an effective bright-time output with excellent accuracy.

In order to solve the above problems, according to the present invention, an image sensor is structured as follows:

(1) In an image sensor constituted by linearly arranging a plurality of linear image sensor ICs, an image sensor IC is structured such that with respect to the output of a plurality of photodiodes, an image signal changed according to an exposure amount, and an initial signal at the time when the photodiode is returned to an original state are held for each of the light receiving elements through a first amplifier connected to each of the photodiodes, and then, the image signal and the initial signal of each of the light receiving elements are sequentially input to a second amplifier through read-out switches, and its output signal is read out as a signal of a unit light receiving device.

(2) When the image signal is held, the read-out switch is placed in an OFF state, and when the initial signal is held, the read-out switch is placed in an ON state, and the initial signal is applied to an input gate of the second amplifier.

(3) When the initial signal is held, the read-out switch is placed in an ON state, and also, the second amplifier is placed in an operating state, and the initial signal is applied to the input gate of the second amplifier.

(4) The second amplifier becomes in an operating state when it reads out the signal from the light receiving element corresponding thereto, and is made to perform an operation to suppress a consumed current in almost all other periods.

(5) When the signal is read out to the outside, for each of the light receiving elements, the initial signal is output, and then, the image signal is output, and this operation is sequentially performed for all the light receiving elements.

(6) The first amplifier becomes an operating state when it holds the signal from the light receiving element corresponding thereto, and is made to perform an operation to suppress a consumed current in almost all other periods.

DESCRIPTION OF THE PREFERRED EMBODIMENTS

According to the present invention, a photodiode is used as a light receiving element of a unit light receiving circuit or block, an amplifier is connected to the photodiode in the block, a terminal voltage of the photodiode changed according to the amount of received light is output through the amplifier, a MOS switch for resetting each photodiode to an initial state is provided in the unit block, terminal voltages before and after resetting of the light receiving element are held through the amplifier, and then, they are sequentially read out, and the signal of the light receiving element of each of a plurality of blocks is sequentially output to the outside.

The present invention will be described below with reference to the drawings.

Figure 1:
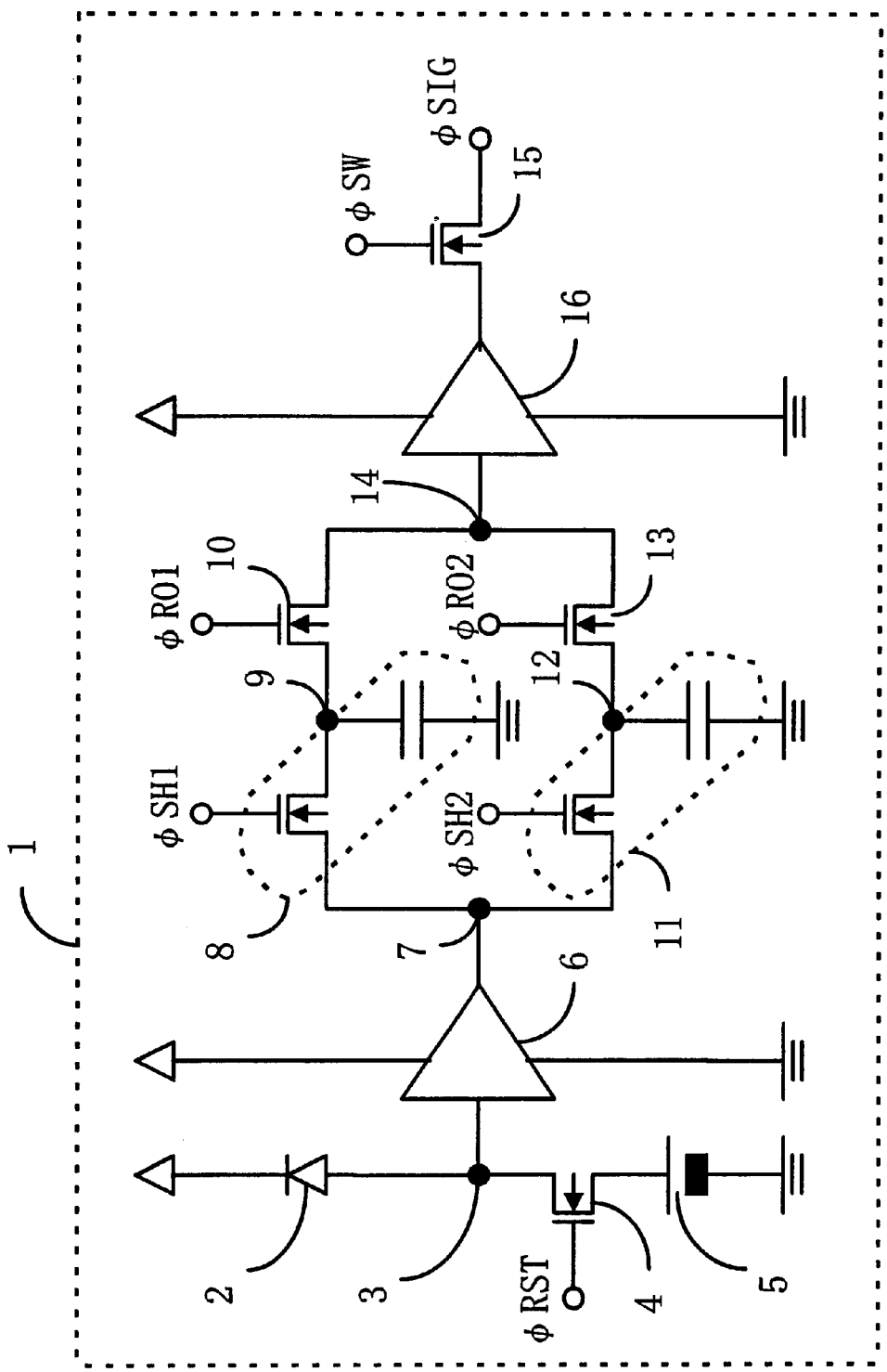
FIG. 1 is a view of a unit light receiving circuit of a first embodiment constituting an image sensor of the present invention.

FIG. 1 shows a first embodiment of a unit light receiving circuit constituting an image sensor of the present invention.

The unit light receiving circuit 1 is structured as follows it is constituted by a photodiode 2 as a light receiving element, a first amplifier 6 for amplifying a signal of the photodiode 2, first holding means 8 for holding an output signal of the first amplifier 6, a first read-out switch 10 for reading out an image signal electric charge held in the first holding means, a reset switch 4 for returning the photodiode 2 to an initial state, second holding means 11 for holding an initial signal when the photodiode 2 is returned to the initial state, a second read-out switch 13 for reading out an initial signal electric charge held in the second holding means 11 and the first read-out switch 10, and a second amplifier 16 for amplifying a signal output from the second read-out switch 13. An N region of a first electrode of the photodiode 2 is connected to a power source potential VDD, and a P region of a second electrode of the photodiode 2 is connected to a drain of a first electrode of the MOS transistor 4 serving as the reset switch for returning the photodiode to the initial state and to an input terminal of the first amplifier 6 for amplifying the signal of the photodiode.

A reference voltage VREF 5 as an initial potential of the photodiode is applied to a source of a second electrode of the MOS transistor 4 serving as the reset switch for returning the photodiode to the initial state. An output terminal of the first amplifier 6 is connected to an input terminal of the first holding means 8 and an input terminal of the second holding means 11. The first read-out switch 10 is connected to the first holding means 8, and the second read-out switch 13 is connected to the second holding means 11, so that the signal held in each of the holding means can be read out. An output terminal of each of the read-out switches is connected to an input terminal of the second amplifier 16, and an output signal, of the second amplifier 6 is read out. In this way, the unit light receiving circuit 1 is structured. A plurality of blocks each having the same structure as the block of the above-described unit light receiving circuit 1 are arranged and included in one linear image sensor. Here, an explanation will be made under the assumption that N-bit blocks are included in the linear image sensor.

Figure 2:
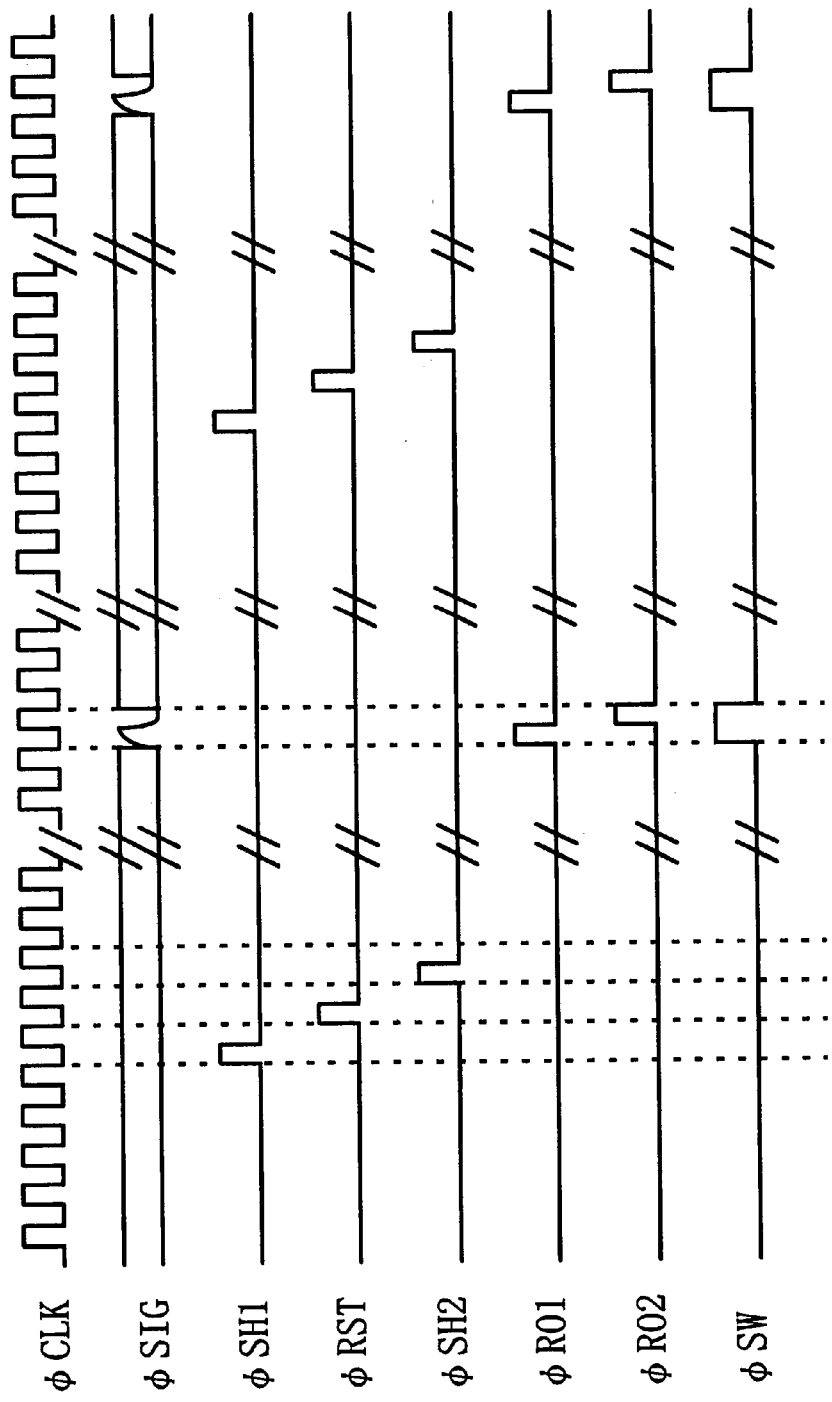
FIG. 2 is a timing chart of the unit light receiving circuit of the first embodiment constituting the image sensor of the present invention.

FIG. 2 is a timing chart showing the operation of the unit light receiving circuit 1 shown in FIG. 1.

Although a clock signal ØCLK is not shown in FIG. 1, the various driving signals shown are supplied synchronously with the clock signal ØCLK as a reference signal for all operations. An explanation will be first made on an operation in which a potential of the photodiode 2 is changed by receiving reflected light from an original and the potential is held as an image signal. The potential of the photodiode 2 which is changed by receiving the reflected light from the original is amplified through the first amplifier. When a pulse ØSH1 is applied to the first holding means 8, the amplified image signal is held in the first holding means 8.

Here, the holding means is constituted by one MOS switch and one capacitor. After the image signal is held in the first holding means, in order to return the photodiode 2 to the initial state, a pulse ØRST is applied to place the reset switch 4 in an ON state, so that the photodiode 2 is returned to the initial state through the potential of the reference voltage 5. Thereafter, a pulse ØSH2 is applied so that the initial potential of the photodiode 2 when it is returned to the initial state is held as the initial signal through the first amplifier in the second holding means 11.

Up to here, the image signal and the initial signal are held in the first holding means 8 and the second holding means 11, respectively. Thereafter, there follows an operation of reading out the held signals at desired timing to the outside. For the purpose of reading out the image signal held in the first holding means 8, a pulse ΦRO1 is applied so that the first read-out gate 10 is turned on, and the image signal is read out from the first holding means 8 and is amplified through the second amplifier 16 to output a signal ΦSIG. Thereafter, for the purpose of reading out the initial signal held in the second holding means 11 with a delay of a half clock, a pulse ΦRO2 is applied so that the second read-out gate 13 is turned on, and the initial signal is read out from the second holding means 11 and is amplified through the second amplifier 16 to output a signal ΦSIG. In the case where there original is black and the reflected light is hardly produced, the image signal becomes almost the same as the initial signal, and the initial signal can be regarded as a dark-time signal. Thus, for each pixel, the image signal and the initial signal regarded as the dark-time signal are output.

Although a signal can be read out even through the operation in accordance with the timing chart of FIG. 2, in the case where the initial signal is read out, it receives a slight influence of a residual electric charge of a proximate image signal through input capacity of the second amplifier 16, stray capacity of a node 14, and the like, and becomes a signal slightly larger than the true initial signal. Since this slight amount depends on an amount of reflected light of the original, the initial signal read out is also changed by the amount of reflected light of the original. A method of operation to suppress this influence will be shown in FIG. 3.

Figure 3:
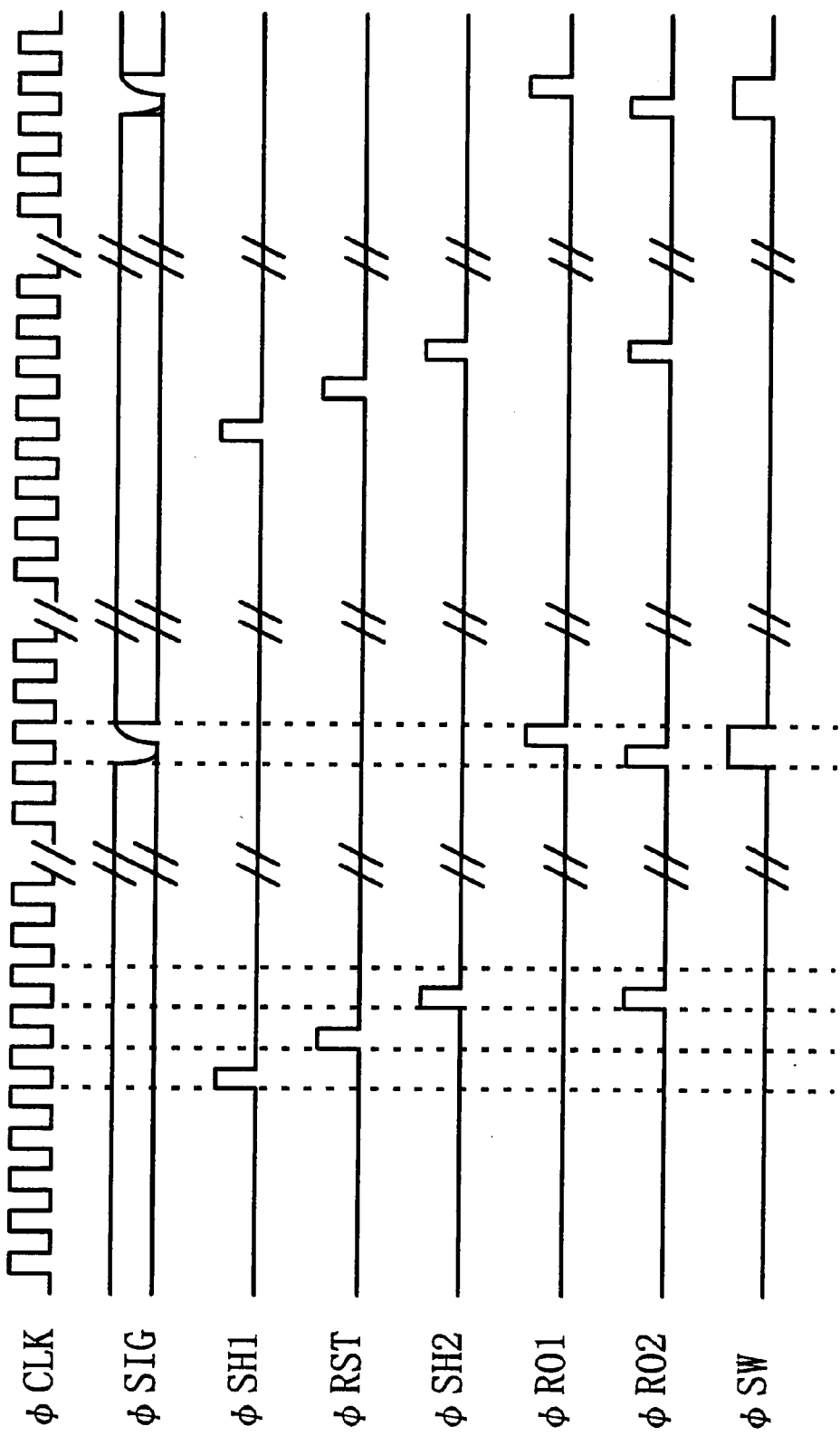
FIG. 3 is another timing chart of the unit light receiving circuit of the first embodiment constituting the image sensor of the present invention.

FIG. 3 is another timing chart of a method for operating the first embodiment of the unit light receiving circuit constituting the image sensor of the present invention.

The difference between FIG. 2 and FIG. 3 is the order of turning on the first read-out gate 10 and the second read-out gate 13. In FIG. 3, when the initial signal is held in the second holding means 11, the pulse ØRO2 is also applied synchronously with the pulse ØSH2 to turn on the second read-out gate 13 so that the initial signal is applied also to the input capacity of the second amplifier 16 and the node 14, and the holding operation is performed. Thereafter, when the held signal is read out at desired timing, the pulse ØRO2 is applied so that the second read-out gate 13 is first turned on, and the initial signal held in the second holding means 11 is first read out to the outside as the signal ØSIG through the second amplifier 16. Thereafter, the pulse ØRO1 is applied so that the second read-out gate 13 is turned off, and at the same time, the first read-out gate 10 is turned on, and the image signal held in the first holding means 8 is read out and is output as the signal ØSIG through the second amplifier 16. By performing such operation, a constant initial signal is always output independently of the amount of reflected light.

Figure 9:
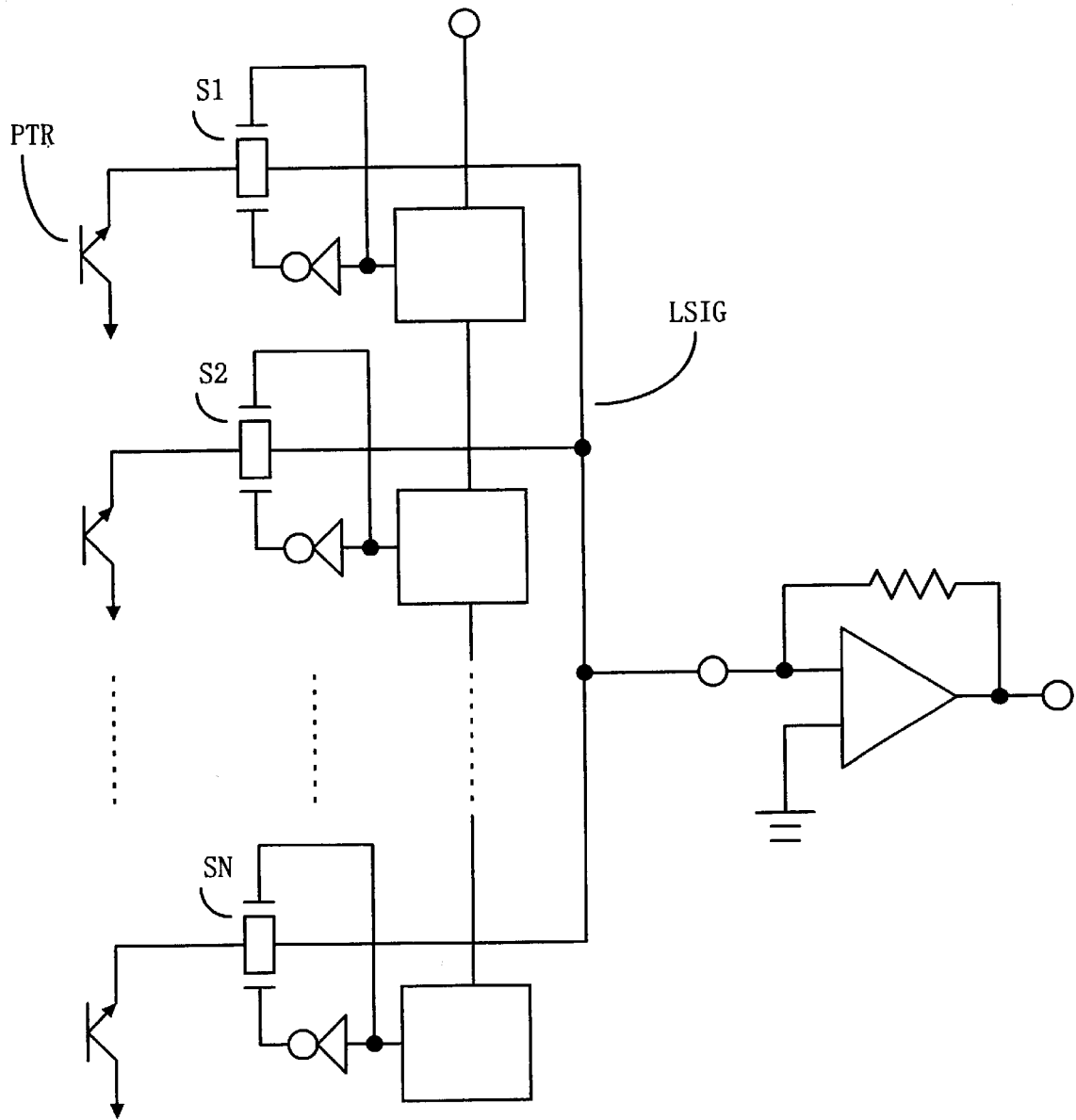
FIG. 9 is a circuit diagram of a conventional image sensor.

In the invention of FIG. 1, as compared with the prior art of FIG. 9, the two amplifiers are provided for the one light receiving element, and in view of generally required low current consumption, it is inferior to the prior art. A circuit having a structure to suppress current consumption will be described in the following.

Figure 4:
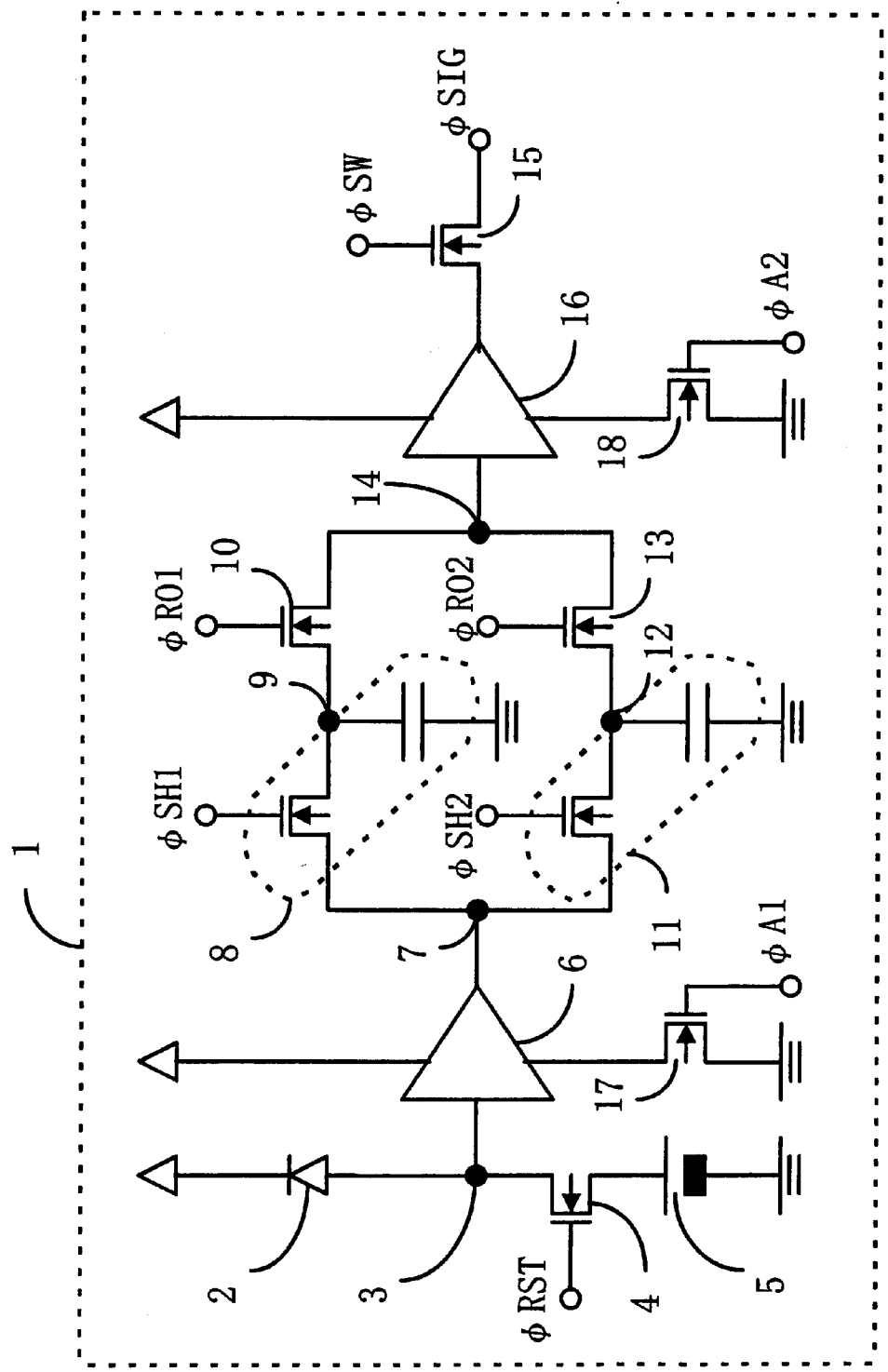
FIG. 4 is a unit light receiving circuit of a second embodiment constituting an image sensor of the present invention.

FIG. 4 shows a second embodiment of a unit light receiving circuit constituting an image sensor of the present invention. A MOS switch 17 is connected so that a first amplifier 6 is selectively operated, and control is made with a pulse ØA1. Similarly, a MOS switch 18 is connected so that a second amplifier 16 is selectively operated, and control is made with a pulse ØA2.

Figure 5:
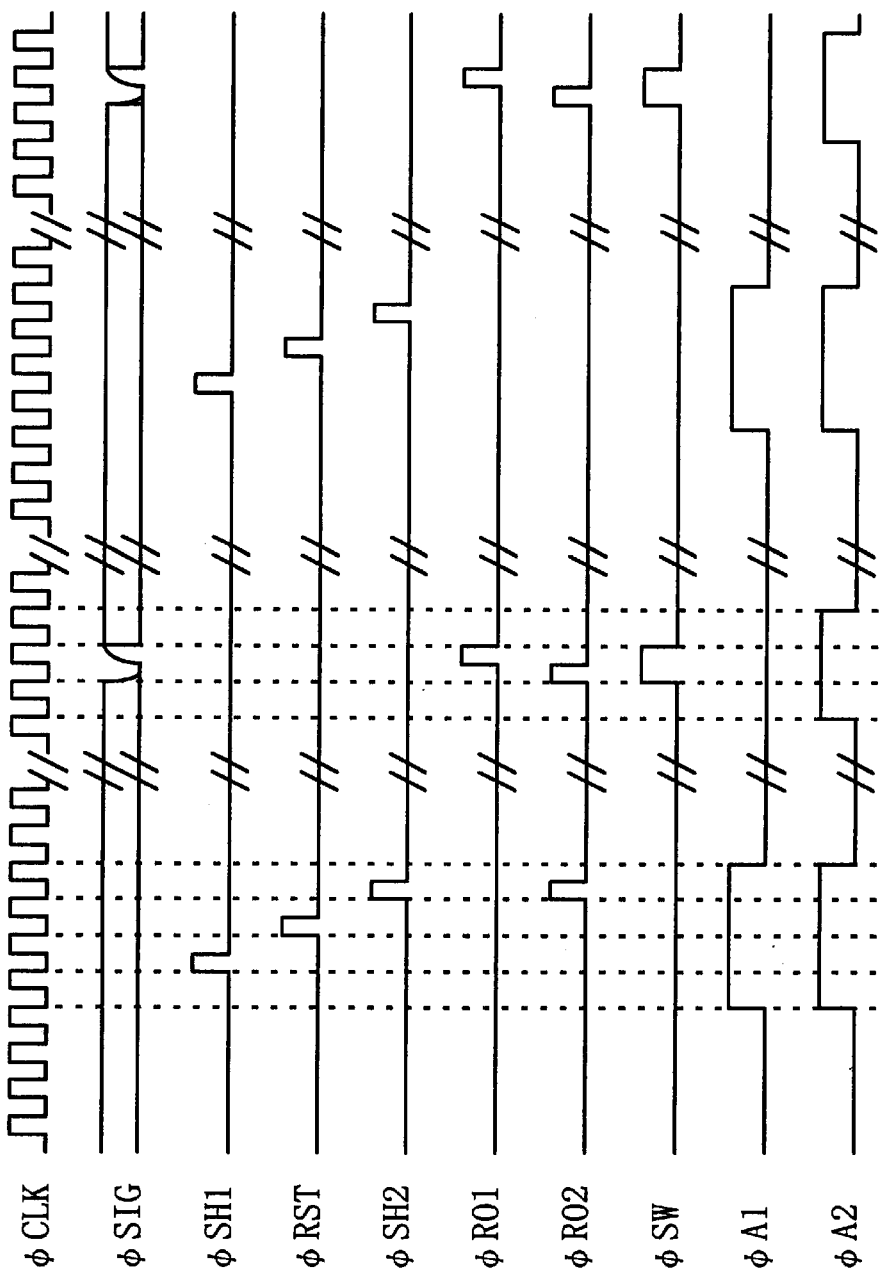
FIG. 5 is a timing chart of the unit light receiving circuit of the second embodiment constituting the image sensor of the present invention.

FIG. 5 is a timing chart of operating the second embodiment of the unit light receiving circuit constituting the image sensor of the present invention.

The operation of the circuit of FIG. 4, together with the timing chart of FIG. 5, will be described. A pulse ØA1 is applied to turn on the MOS switch 17 so that the first amplifier 6 operates and the image signal and the initial signal of the photodiode 2 may be held in the holding means and to turn off the MOS switch 17 so that a node 3 does not receive an influence of the first amplifier 6 when the image signal and the initial signal of the photodiode 2 are being held in the holding means; and the photodiode 2 is returned into the initial state. With respect to the second amplifier 16, as explained in FIG. 3, when the initial signal of the photodiode 2 is held in the second holding means 11, since the second read-out gate is also turned on and the initial signal is applied also to the node 14 and the input gate of the second amplifier 16, a pulse ØA2 is applied when the initial signal is held so that the second amplifier 16 is also made an operating state to cause the same state as that at the time of reading of the signal. Further, the pulse ØA2 is applied so that the second amplifier 16 operates even at the time when the image signal and the initial signal are read out from the first holding means 8 and the second holding means 11. By performing such an operation, consumed current is lowered as compared to the first embodiment.

Figure 6:
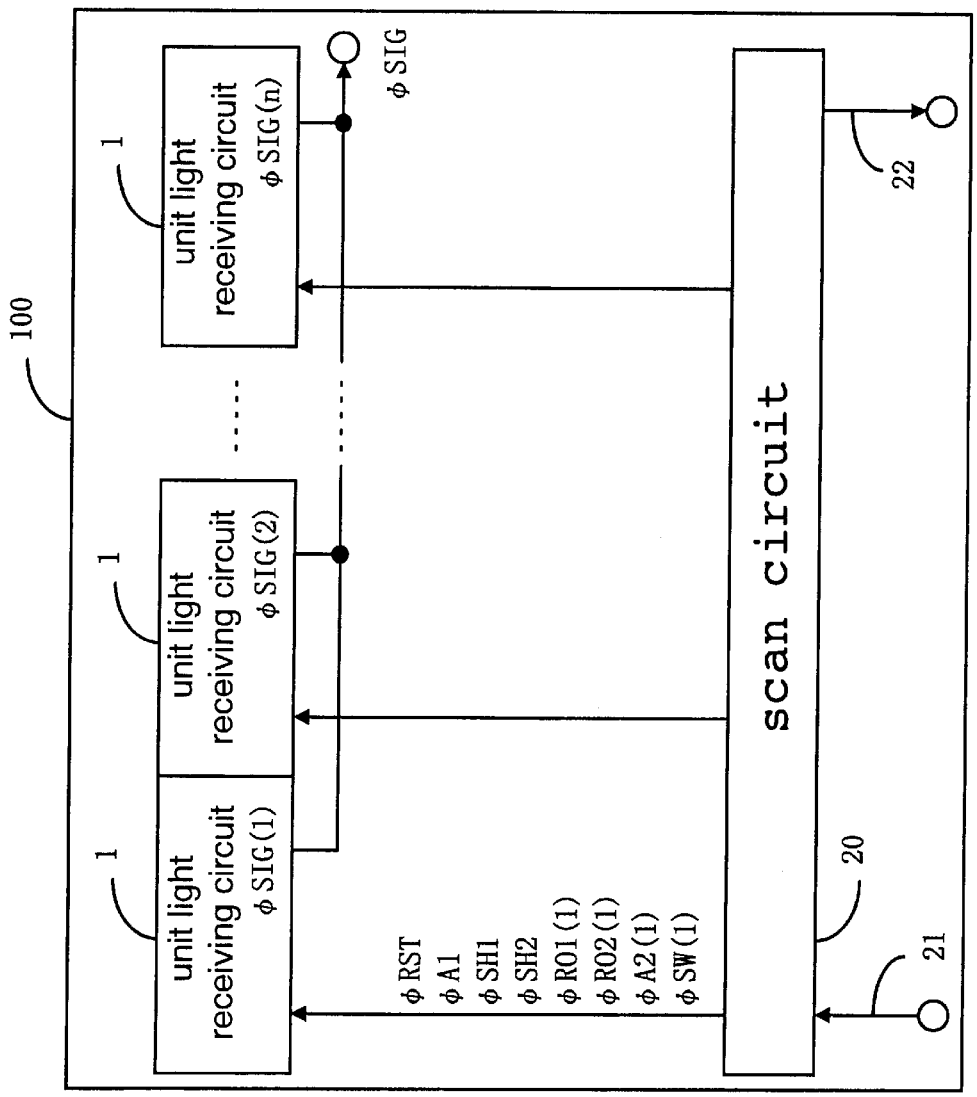
FIG. 6 is a block diagram of a linear image sensor IC constituting an image sensor of the present invention.

FIG. 6 is a block diagram showing an embodiment of a linear image sensor IC using a unit light receiving circuit constituting an image sensor of the present invention. A linear image sensor IC 100 is structured such that a plurality of unit light receiving circuits 1 are linearly arranged, and at least a scan circuit 20 is included. In FIG. 6, such a structure is adopted that for convenience, n unit light receiving circuits 1 are arranged, various pulses are applied to the plurality of unit light receiving circuits by the scan circuit 20, and the image signals and the initial signals obtained by the plurality of unit light receiving circuits are sequentially read out. An input signal 21 necessary for a scanning operation is input to the scan circuit 20, and a scan output signal 22 necessary for an operation at the time when a plurality of such linear image sensor ICs 100 are linearly arranged is output.

Figure 7:
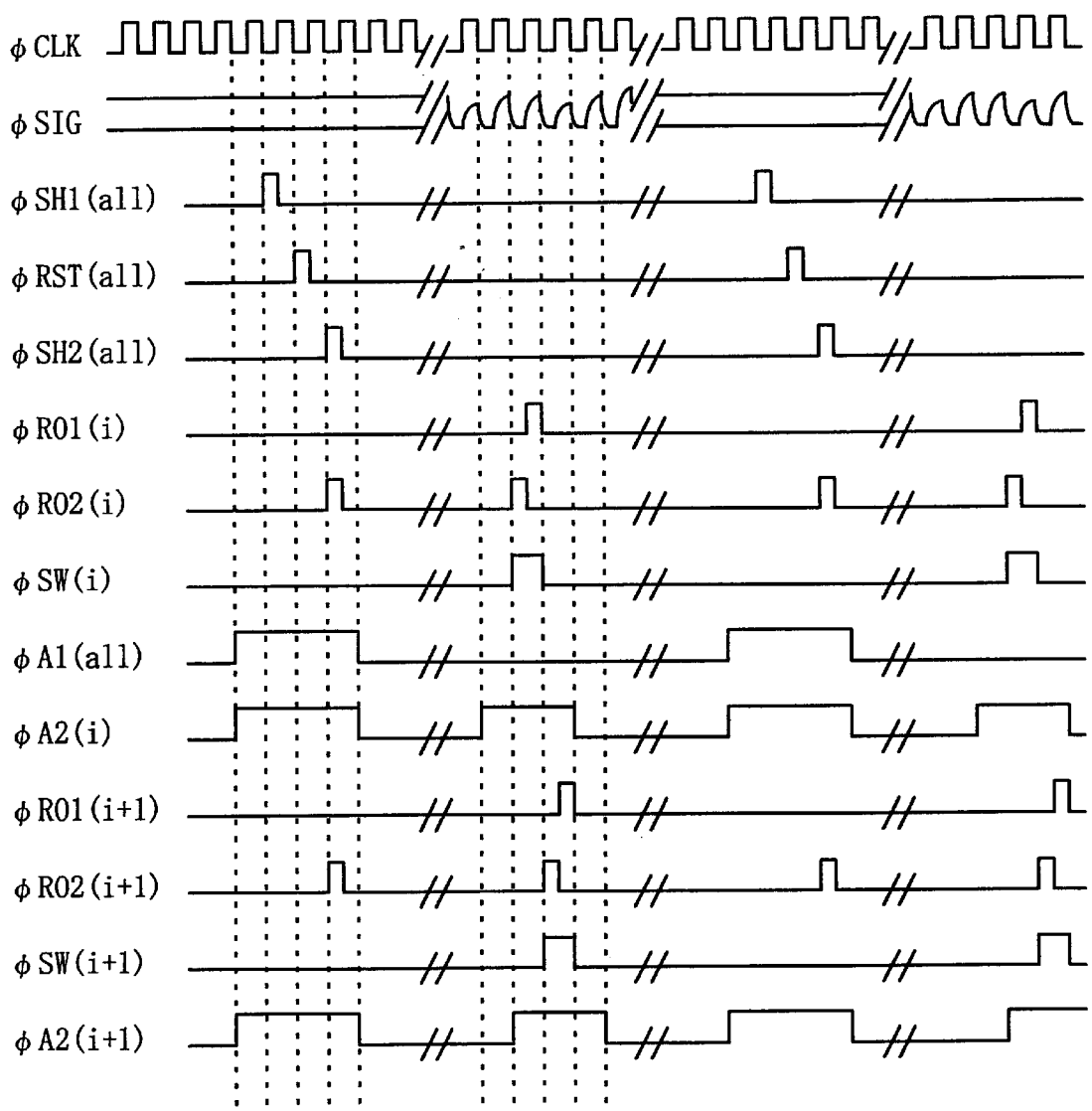
FIG. 7 is a timing chart of the linear image sensor IC constituting the image sensor of the present invention.

FIG. 7 is a timing chart showing a part of the operations of the block diagram of FIG. 6. The image signal and the initial signal in each of the unit light receiving circuits are held at a pulse ØSH1 (all) and a pulse ØSH2 (all) of the same timing, and timing of resetting of each photodiode is also made by a pulse ØRST (all) at the same time. In order that these operations are normally carried out, each of the first amplifiers is also operated by application of a pulse ØA1 (all) and each of the second amplifiers is also operated by a pulse ØA2 (i) at the same time.

When the held signals are read out to the outside, a signal is applied from the scan circuit so that the initial signal and the image signal are sequentially read out in order of arrangement from each of the linearly arranged unit light receiving circuits. For convenience, a case of reading out signals from the i-th and (i+1)th unit light receiving circuits will be described. A pulse ØSW(i) is applied so that-signals held in the i-th unit light receiving circuit are read out to the outside, and the initial signal of the i-th unit light receiving circuit is read out through the first half of the pulse synchronously with a pulse ØRO2(i). Thereafter, the image signal of the i-th unit light receiving circuit is output through the latter half of the pulse ØSW(i) synchronously with a pulse ØRO1(i). In this way, when the image signal from the i-th unit light receiving circuit is output to the outside, a pulse ØSW(i+1) is applied so that signals held in the next (i+1)th unit light receiving circuit are read out to the outside. The initial signal of the (i+1)th unit light receiving circuit is read out through the first half of the pulse synchronously with a pulse ØRO2 (i+1). Thereafter, the image signal of the (i+1)th unit light receiving circuit is output through the latter half of the pulse ØSW(i+1) synchronously with a pulse ØRO1(i+1). When these series of operations are performed for the first unit light receiving circuit to the n-th unit light receiving circuit, the image signal of the n-bit linear image sensor is obtained.

Figure 8:
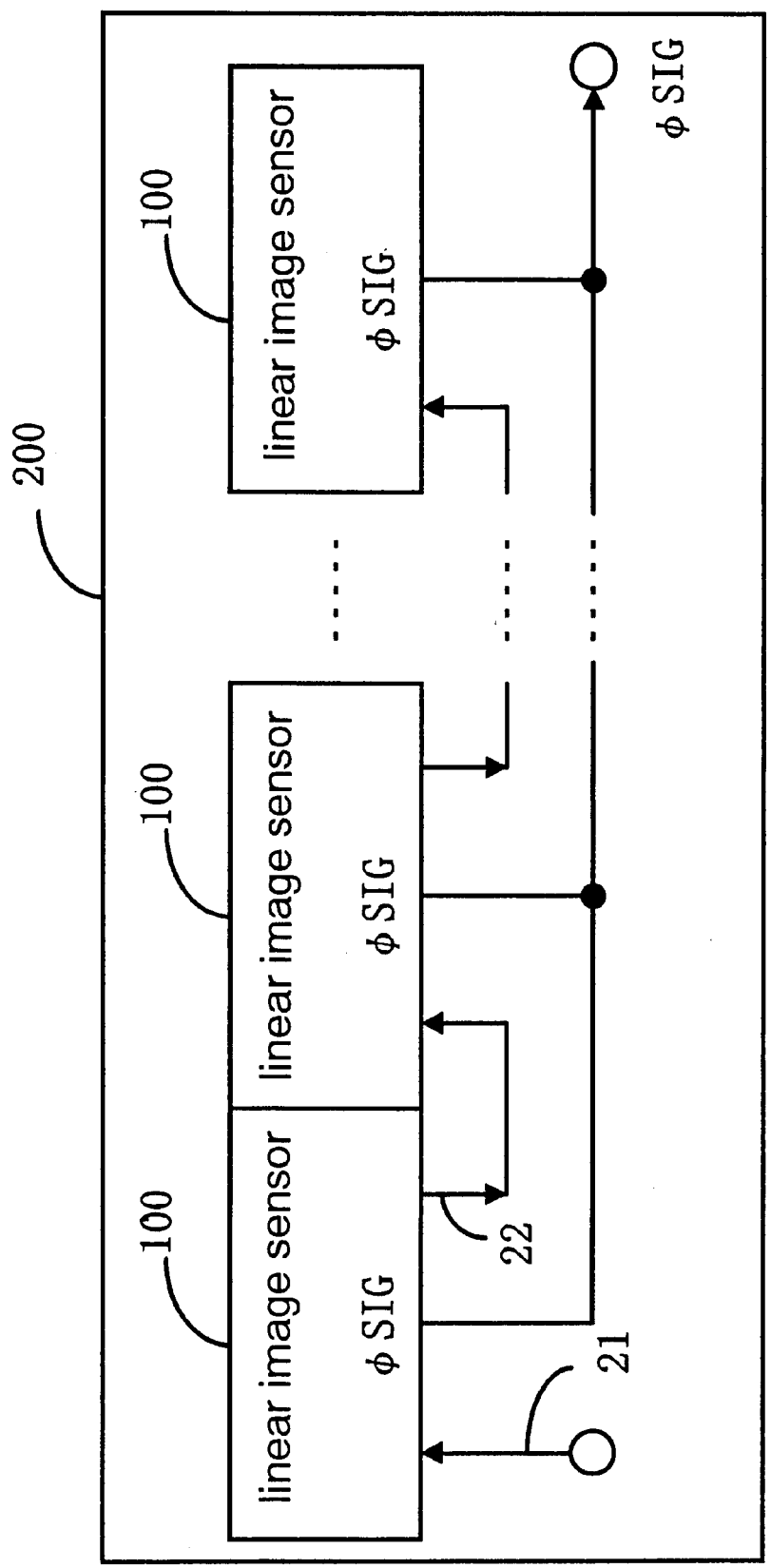
FIG. 8 is a block diagram of the image sensor of the present invention.

FIG. 8 shows an embodiment of an image sensor of the present invention. A plurality of linear image sensor ICs 100 shown in FIG. 6 are linearly arranged to form an image sensor 200 which reads out an original in equal magnification. For convenience, an input signal 21 for scanning is input to the linear image sensor IC disposed at the left end, and an output signal 22 for scanning is input as an input signal 21 to the next disposed linear image sensor 100 at the second position from the left. In the same manner, the plurality of linear image sensors are connected, and further, signal output terminals of the respective linear image sensors are connected so that the image signals can be read out as a ØSIG.

In this way, the photodiode is used as the light receiving element, and the second electrode at the side where its potential is changed according to the amount of received light is returned to the initial state by applying the initial potential through the reset switch after the signal is read out, so that deterioration in picture quality, such as a residual image due to a residual electric charge, which has been seen in the conventional image sensor in which the photodiode is used as the light receiving element, is greatly improved, and excellent picture quality is obtained.

As described above, the present invention provides an image sensor with a low residual image, and provides an image sensor which can obtain an effective bright-time output with excellent accuracy through a simple external circuit and with little requirement for an external memory or with a small capacity external memory, since at the time of operation, a reference voltage, which is comparable with a dark-time output voltage and becomes a potential at the time when a photodiode is initialized, and a bright-time output voltage are always output for each light receiving element. Besides, a high-speed operation is also made possible.

What is claimed is:

1. In an image sensor comprising a plurality of linearly arranged linear image sensor ICs each having a plurality of unit light receiving circuits in which a photodiode serves as a light receiving element, wherein each unit light receiving circuit comprises: a first amplifier for amplifying an output signal of the photodiode; first holding means for holding an output signal of the first amplifier; a first read-out switch for reading out an electric charge associated with an image signal held in the first holding means; a reset switch for returning the photodiode to an initial state; second holding means for holding an initial signal produced at the output of the photodiode when the photodiode has been returned to the initial state; a second read-out switch for reading out an electric charge associated with the initial signal held in the second holding means; and a second amplifier for amplifying the signals output from the first read-out switch and the second read-out switch;

wherein each unit light receiving circuit is structured such that a first electrode of the photodiode is tied to a fixed potential, a second electrode opposite the first electrode of the photodiode and having a potential which is changed in accordance with an amount of received light is connected to a first electrode of the reset switch, a second electrode of the reset switch is connected to a reference voltage which serves as an initial potential of the photodiode to form the initial signal, the second electrode of the photodiode is connected to an input terminal of the first amplifier, an output terminal of the first amplifier is connected to an input terminal of the first holding means and an input terminal of the second holding means, an input terminal of the first read-out switch is connected to the first holding means and an input terminal of the second read-out switch is connected to the second holding means so that the signal held in each of the holding means may be read out by activation of the read-out switches, an output terminal of each of the read-out switches is connected to an input terminal of the second amplifiers, and an output of the second amplifier is read-out as an image signal when the first read-out switch is activated and as an initial signal when the second read-out switch is activated; and wherein each linear image sensor IC comprises a plurality of linearly arranged unit light receiving circuits; and a scan circuit for scanning the first holding means, the second holding means, the reset switch, the first read-out switch, the second read-out switch, and the second amplifier of the respective unit light receiving circuits so that the initial signal of each of the unit light receiving circuits and the image signal corresponding to the amount of received light are sequentially read out in order of arrangement of the unit light receiving circuits.

2. An image sensor according to claim 1; wherein the scan circuit controls the first and second holding means and the first and second read-out switches such that when the image signal corresponding to the amount of received light is held in the first holding means, the first read-out switch is placed in an OFF state, and when the initial signal is held in the second holding means, the second read-out switch is placed in an ON state.

3. An image sensor according to claim 1; wherein the scan circuit selects the second amplifier to perform an amplifying operation only when a signal is to be output from the unit light receiving circuit so that consumed current is suppressed in time periods when the second amplifier is not selected.

4. An image sensor according to claim 1; wherein the scan circuit controls the second holding means, the second read-out switch and the second amplifier such that when the initial signal is held in the second holding means, the second read-out switch is placed in an ON state and the second amplifier is selected to perform an amplifying operation.

5. An image sensor according to claim 1; wherein the scan circuit controls the unit light receiving circuit such that signals are output from the unit light receiving circuit in an order whereby the initial signal indicating the initial potential of the photodiode at the time of reset thereof is first read-out, and then, the image signal corresponding to the amount of received light is read out.

6. An image sensor according to claim 1; wherein the first amplifier is selected to perform an amplifying operation only when the image signal corresponding to the amount of received light and the initial signal are to be held in the first holding means and the second holding means, respectively, so that consumed current is suppressed in other time periods.

7. An image sensor according to claim 1; wherein the first and second holding means each comprise a series combination of a switching element and a charge storage device.

8. An image sensor according to claim 1; wherein the first read-out switch, the reset switch and the second read-out switch comprise transistors having gate-electrodes connected to the scan circuit for selective activation by output signals of the scan circuit.

9. A light receiving circuit for an image sensor, comprising: a photodetector; a first signal holding circuit for holding an image signal output by the photodetector when the photodetector is exposed to an image; a reset switch for resetting the photodetector to an initial state; a second signal holding circuit for holding an initial signal output by the photodetector when the photodetector is reset to the initial state; a first read-out switch connected to an output of the first signal holding circuit for reading out the image signal; and a second read-out switch connected to an output of the second signal holding circuit, the second read-out switch being turned on only when the first read-out switch is turned off.

10. A light receiving circuit according to claim 9; further comprising a first amplifier disposed between the photodetector and the first and second signal holding circuits, and a second amplifier disposed at an output of the first and second read-out switches.

11. A light receiving circuit according to claim 10; further comprising switch elements for selectively activating the first and second amplifiers so that the first amplifier is activated only when the initial signal or the image signal are to be held by the signal holding circuits or output from the light receiving circuit.

12. A light receiving circuit according to claim 9; wherein the first and second holding circuits each comprise a series combination of a switching element and a charge storage device.

13. An image sensor having a plurality of linearly-arranged image sensor circuits each having a plurality of light receiving circuits, and a scan circuit for scanning the respective image sensor circuits; wherein the light receiving circuits each comprise the light receiving circuit according to claim 9.

14. A light receiving circuit according to claim 9; wherein the photodetector comprises a photodiode.

15. A light receiving circuit according to claim 9; wherein the first and second signal holding circuits each comprise a series combination of a switching element and a charge storage device.

16. A light receiving circuit according to claim 10; wherein a first electrode of the photodetector is tied to a fixed potential, a second electrode opposite the first electrode of the photodetector and having a potential which is changed in accordance with an amount of received light is connected to a first electrode of the reset switch, a second electrode of the reset switch is connected to a reference voltage which serves as an initial potential of the photodetector to produce the initial signal, the second electrode of the photodetector is connected to an input terminal of the first amplifier, an output terminal of the first amplifier is connected to an input terminal of the first signal holding circuit and an input terminal of the second signal holding circuit, an input terminal of the first read-out switch is connected to the first signal holding circuit and an input terminal of the second read-out switch is connected to the second signal holding circuit so that the signal held in each of the signal holding circuits may be read out by activation of the read-out switches, an output terminal of each of the read-out switches is connected to an input terminal of the second amplifier, and an output of the second amplifier is read out as an image signal when the first read-out switch is activated and as an initial signal when the second read-out switch is activated.

17. A light receiving circuit according to claim 10; wherein the first amplifier is selected to perform an amplifying operation only when the image signal and the initial signal are to be held in the first signal holding circuit and the second signal holding circuit, respectively, so that consumed current is suppressed in other time periods.

18. An image sensor according to claim 13; wherein the scan circuit scans the first signal holding circuit, the second signal holding circuit, the reset switch, the first read-out switch and the second read-out switch of the respective light receiving circuits so that the initial signal of each of the light receiving circuits and the image signal corresponding to the amount of received light are sequentially read out in order of arrangement of the light receiving circuits.

19. An image sensor according to claim 13; wherein the scan circuit controls the first and second signal holding circuits and the first and second read-out switches such that when the image signal is to be held in the first signal holding circuit, the first read-out switch is placed in an OFF state, and when the initial signal is to be held in the second signal holding circuit, the second read-out switch is placed in an ON state.

20. An image sensor according to claim 13; wherein the first read-out switch, the reset switch and the second read-out switch comprise transistors having gate electrodes connected to the scan circuit for selective activation by output signals of the scan circuit.

* * * * *